US012373215B2

(12) United States Patent
Choudhary et al.

(10) Patent No.: US 12,373,215 B2
(45) Date of Patent: Jul. 29, 2025

(54) USING A NEXT FETCH PREDICTOR CIRCUIT WITH SHORT BRANCHES AND RETURN FETCH GROUPS

(71) Applicant: Apple Inc., Cupertino, CA (US)

(72) Inventors: Niket K. Choudhary, Santa Clara, CA (US); Mary D. Brown, Austin, TX (US); Ethan R. Schuchman, Saratoga, CA (US); Ronald P. Hall, Cedar Park, TX (US); Ian D. Kountanis, Santa Clara, CA (US); Douglas C. Holman, San Francisco, CA (US); Ilhyun Kim, Portland, OR (US); Abhishek Kumar, Chicago, IL (US); Siavash Zangeneh Kamali, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/814,729

(22) Filed: Jul. 25, 2022

(65) Prior Publication Data

US 2024/0028339 A1    Jan. 25, 2024

(51) Int. Cl.
*G06F 9/38* (2018.01)
*G06F 12/0875* (2016.01)

(52) U.S. Cl.
CPC ........ *G06F 9/3802* (2013.01); *G06F 12/0875* (2013.01); *G06F 2212/452* (2013.01)

(58) Field of Classification Search
CPC .... G06F 9/3802; G06F 9/3804; G06F 9/3806; G06F 9/3808; G06F 9/381; G06F 9/3814; G06F 9/3842; G06F 9/3844; G06F 9/3848; G06F 9/3856; G06F 9/3005; G06F 9/30054; G06F 9/30058; G06F 9/323; G06F 9/30061; G06F 9/30065; G06F 9/322; G06F 9/325
See application file for complete search history.

(56) References Cited

U.S. PATENT DOCUMENTS

| 5,799,180 A | * | 8/1998 | Shiell | G06F 9/30058 |
| | | | | 712/E9.05 |
| 5,889,986 A | * | 3/1999 | Nguyen | G06F 9/3806 |
| | | | | 712/237 |
| 5,951,679 A | * | 9/1999 | Anderson | G06F 9/3842 |
| | | | | 712/E9.058 |

(Continued)

OTHER PUBLICATIONS

International Search Report and Written Opinion in PCT Appl. No. PCT/US2023/025570 mailed Oct. 5, 2023, 8 pages.

*Primary Examiner* — Andrew Caldwell
*Assistant Examiner* — Kasim Alli
(74) *Attorney, Agent, or Firm* — Kowert, Hood, Munyon, Rankin & Goetzel, P.C.; Scott W. Pape; Dean M. Munyon

(57) ABSTRACT

An apparatus includes an instruction cache circuit and an instruction fetch circuit. The instruction fetch circuit is configured to retrieve, from the instruction cache circuit, a fetch group that includes a plurality of instructions for execution by a processing circuit, and to make a determination that the fetch group includes a control transfer instruction that is predicted to be taken. A target address associated with the control transfer instruction is directed to an instruction within the fetch group. The instruction fetch circuit is further configured to, based on the determination, alter instructions within the fetch group in a manner that is based on a type of the control transfer instruction.

20 Claims, 11 Drawing Sheets

(56) References Cited

U.S. PATENT DOCUMENTS

| | | | |
|---|---|---|---|
| 6,385,719 B1 | 5/2002 | Derrick et al. | |
| 6,578,138 B1* | 6/2003 | Kyker | G06F 9/381 |
| | | | 712/E9.058 |
| 7,475,231 B2* | 1/2009 | Tran | G06F 9/3806 |
| | | | 712/E9.058 |
| 8,578,141 B2* | 11/2013 | Jarvis | G06F 9/3806 |
| | | | 712/241 |
| 9,052,910 B2* | 6/2015 | Hall | G06F 9/381 |
| 10,445,102 B1* | 10/2019 | Pistol | G06F 9/3832 |
| 10,747,539 B1 | 8/2020 | Hakewill et al. | |
| 11,256,505 B2* | 2/2022 | Annamalai | G06F 9/30189 |
| 2005/0198481 A1* | 9/2005 | Henry | G06F 9/3806 |
| | | | 712/238 |
| 2006/0095746 A1 | 5/2006 | Uchiyama et al. | |
| 2012/0117362 A1 | 5/2012 | Bhargava et al. | |
| 2012/0290821 A1 | 11/2012 | Shah et al. | |
| 2013/0339699 A1* | 12/2013 | Blasco-Allue | G06F 9/382 |
| | | | 712/241 |
| 2014/0075156 A1 | 3/2014 | Blasco-Allue et al. | |
| 2014/0136822 A1* | 5/2014 | Suggs | G06F 9/3814 |
| | | | 712/241 |
| 2014/0344558 A1 | 11/2014 | Holman et al. | |
| 2015/0169041 A1* | 6/2015 | Blasco | G06F 1/3275 |
| | | | 713/320 |
| 2015/0205613 A1* | 7/2015 | Bhatia | G06F 9/30054 |
| | | | 712/207 |
| 2015/0293577 A1* | 10/2015 | Hall | G06F 9/325 |
| | | | 713/320 |
| 2020/0150966 A1 | 5/2020 | Agrawal et al. | |

* cited by examiner

*Method 600*

> Retrieving, by an instruction fetch circuit, a fetch group that includes a plurality of instructions for execution by a processing circuit.
> 610

> Determining, by the instruction fetch circuit, that the fetch group includes a control transfer instruction that is predicted to be taken and that the control transfer instruction has an associated target address located within the fetch group.
> 620

> Based on the determining, alter an order of instructions within the fetch group in a manner that is based on a type of the control transfer instruction.
> 630

*FIG. 6*

USING A NEXT FETCH PREDICTOR CIRCUIT WITH SHORT BRANCHES AND RETURN FETCH GROUPS

BACKGROUND

Technical Field

Embodiments described herein are related to computing systems, including systems-on-a-chip (SoCs). More particularly, embodiments are disclosed to techniques for managing control transfer instructions in a central processor unit.

Description of the Related Art

Processor circuits, for example, central processor units (CPUs), generally process instructions in a serial order, with a program counter typically incremented to address a next instruction in the program sequence. Control transfer instructions are a type of instruction that may result in a deviation from sequential program order. Control transfer instructions include, for example, branch instruction, call instructions, and return instructions. When a CPU executes one of these control transfer instructions, the program counter, rather than being incremented to address a next instruction, may be loaded with a target address associated with the control transfer instruction. Control transfer instructions enable use of functions, loops, conditional program flows, and the like.

To increase performance, many CPUs retrieve a number of instructions at a time in what may be referred to as a fetch group. Instead of simply retrieving a single instruction at a time, a fetch group is retrieved on the assumption that a plurality of sequential instructions will be executed in a row before a control transfer instruction causes a deviation to the program flow. Branch prediction circuits may be used to predict when a fetch group may include a control transfer instruction that will change the program flow, allowing the CPU to retrieve instructions from a target address of the control transfer instruction rather than from a sequential fetch address.

BRIEF DESCRIPTION OF THE DRAWINGS

The following detailed description makes reference to the accompanying drawings, which are now briefly described.

FIG. 6 depicts a flow diagram of an embodiment of a method for retrieving a fetch group using disclosed techniques.

Figure 1:
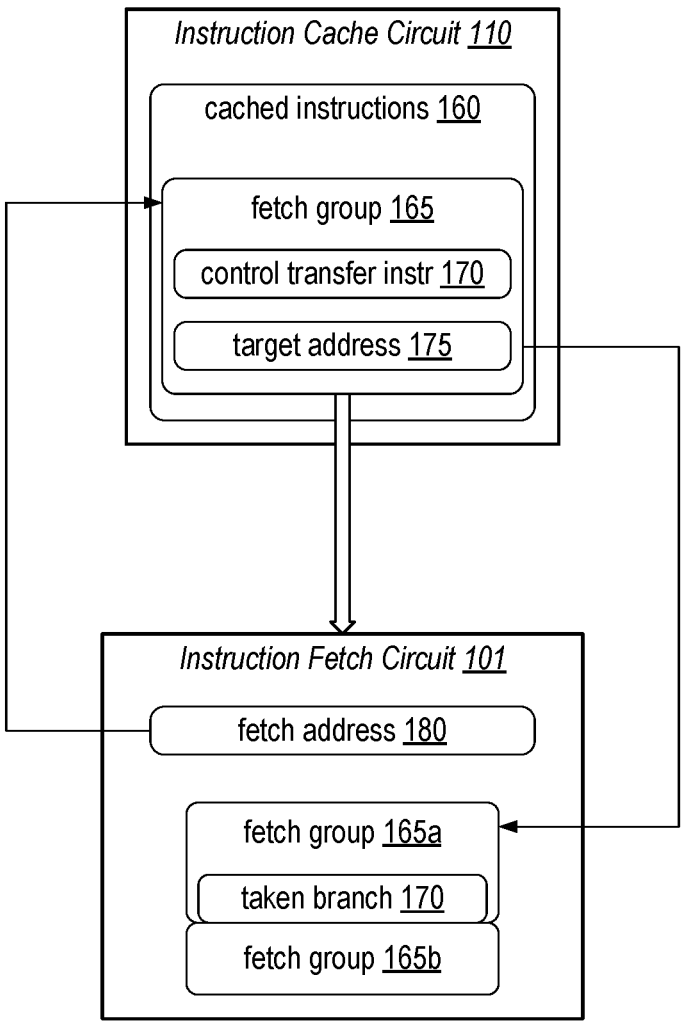
FIG. 1 illustrates a block diagram of an embodiment of a system that includes an instruction cache circuit and an instruction fetch circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Generally, a processor circuit includes an instruction fetch circuit for retrieving a group of instructions (referred to herein as a "fetch group") from one or more memory circuits. A next fetch predictor circuit may also be used to predict an address for retrieving a next fetch group (referred to herein as a "fetch address"). This next fetch address may be determined based on a prediction of a current fetch group including a control transfer instruction. As used herein, a "control transfer instruction" is a type of instruction that may result in a subsequent instruction to be performed having a non-sequential address from the control transfer instruction. Various types of control transfer instructions include, but are not limited to, branch instructions, call instructions, and return instructions.

The next fetch predictor circuit may, in some embodiments, be limited to predicting one control transfer function within a given fetch group. A likelihood of having more than one control transfer instruction in the given fetch group may depend, for example, on a number of instructions in a fetch group. The greater the number of instructions, the greater the chance of including a plurality of control transfer instructions. Instructions at subsequent addresses that are sequential to a taken control transfer instruction may, in some embodiments of a processor circuit, be discarded or otherwise ignored since the program flow will diverge from a sequential path to the target address of the taken control transfer instruction. Accordingly, identifying control transfer instructions within a fetch group may improve processor bandwidth by avoiding additional processing of instructions after a taken control transfer instruction and determining a next fetch address to retrieve instructions at the target address. If, however, a given fetch group includes two or more control transfer instructions that will be taken, then the next fetch predictor circuit may only be capable of identifying the first control transfer instruction, resulting in the second control transfer instruction either being discarded and subsequently re-fetched, or being overlooked by the next fetch predictor circuit.

The present disclosure considers novel digital circuits for use in an instruction fetch circuit of a processor circuit that identify particular program flow cases in which a next fetch predictor circuit may not accurately identify multiple control transfer instructions in a given fetch group. For example, an instruction fetch circuit of a processor circuit may be configured to retrieve, from an instruction cache circuit, a fetch group that includes a plurality of instructions for execution by the processor circuit. The instruction fetch circuit may make a determination that the fetch group includes a control transfer instruction that is predicted to be taken in which a target address associated with the control transfer instruction is directed to an instruction within the fetch group. Based on the determination, the instruction fetch circuit may alter instructions within the fetch group in a manner that is based on a type of the control transfer instruction.

For example, these novel circuits may attempt to identify several typical program flow cases that may be handled more easily without using a next fetch predictor circuit. This may approximate the handling of two taken branches per fetch group by allowing the next fetch predictor circuit to identify a second control transfer instruction rather than the first. Three of these typical cases are short backward branches, short forward branches, and return fetch groups. In regards to backward and forward branches, "short" refers branches in which the target of the branch is within a same fetch group as the branch instruction.

A "short backward branch" is a branch instruction that directs program flow backward (e.g., a program loop) within the same fetch group as the branch instruction. For short backward branches, a portion of the fetch group may be replicated in an instruction buffer, effectively resulting in two separate iterations of the taken branch per fetch group.

A "short forward branch" is a branch instruction that directs program flow forward to a target address that is within the same fetch group as the branch instruction. Short forward branches may be identified by novel fetch circuits, allowing the next fetch predictor circuit to be trained to predict either a subsequent next taken control transfer function in the fetch group, or a subsequent instruction after the end of the current fetch group.

When the taken control transfer instruction is a call instruction, program flow diverges from a sequential path to an address indicated in the call instruction. A subsequent return instruction returns program flow back an instruction immediately following the call instruction. The address of the instruction after the call instruction is a "return address." A "return fetch group" is a group of instructions retrieved using a return address in response to fetching a return instruction. In some of the disclosed embodiments, return fetch groups may be limited to return instructions that are retrieved within one or two fetch groups from the retrieval of the call instruction. When the call instruction is fetched, a return address stack is pushed with the return address (typically an address subsequent to the call instruction). In many programs, however, at least some instructions at the return address are included in the current fetch group. Rather than discarding instructions at the return address and then re-fetching them when a return instruction is retrieved at the end of the called function, these instructions are saved in a return fetch group stack associated with the return address stack. When the return instruction is retrieved, the saved instructions from the return fetch group stack are retrieved instead of being re-fetched.

Identification of such program flow cases may improve an efficiency of a next fetch predictor circuit, thereby increasing a bandwidth of a processor circuit. Programs may, therefore, be executed with increased efficiency, thereby improving system performance observed by a user and/or increasing a number of programs that may executed concurrently.

FIG. 1 illustrates a block diagram of one embodiment of a system in which cached instructions are retrieved in fetch groups and control transfer instructions are identified. As illustrated, system 100 includes instruction fetch circuit 101 coupled to instruction cache circuit 110 via a plurality of bus wires. In some embodiments, instruction fetch circuit 101 and instruction cache circuit 110 may be included as part of a same processor circuit within an integrated circuit. System 100 may be a part of a computing system, such as a desktop or laptop computer, a smartphone, a tablet computer, a wearable smart device, or the like.

As illustrated, instruction cache circuit 110 is configured to store cached instructions 160 that have been fetched for execution by a processor circuit (not shown) in system 100. In some embodiments, one cache line in instruction cache circuit 110 may hold one fetch group of instructions (e.g., fetch group 165), while in other embodiments, one fetch group may span across two or more cache lines, or one cache line may hold two or more fetch groups. Instruction cache circuit 110 may include a random-access memory (RAM) circuit for storing, in a plurality of cache lines, cached instructions 160 as well as a content-addressable memory (CAM) circuit for storing cache tags corresponding to respective ones of the cache lines.

Instruction fetch circuit 101, as shown, is configured to retrieve, from instruction cache circuit 110, fetch group 165 that includes a plurality of instructions for execution by the processor circuit. For example, instruction fetch circuit 101 may retrieve instructions of fetch group 165 by issuing a fetch request to instruction cache circuit 110 using fetch address 180. If instruction cache circuit 110 currently holds a valid copy of the requested instructions, then fetch group 165, corresponding to fetch address 180, is returned to instruction fetch circuit 101. Otherwise, instruction cache circuit 110 may issue a memory request to retrieve the requested instructions from a different memory circuit in system 100, and, in some cases, may cache the retrieved instructions within one or more cache lines.

Instruction fetch circuit 101 may be further configured to make a determination that fetch group 165 includes control transfer instruction (instr) 170 that is predicted to be taken. In addition, target address 175, associated with control transfer instruction 170, is directed to an instruction within fetch group 165. For example, control transfer instruction 170 and target address 175 may be included as part of one of the cases disclosed above, such as a short-backward or short-forward branch, or a return fetch group. An indication that fetch group 165 includes control transfer instruction 170 and target address 175 may be provided to instruction fetch circuit 101 along with fetch address 180. For example, a next fetch predictor circuit may store entries related to previously retrieved fetch groups, these entries including indications of control transfer functions. If the same fetch group is to be requested again, the entries may provide indicators that can be used to possibly reduce a time for retrieving the instructions that will be executed. Additional information regarding next fetch predictor circuits is disclosed below in regard to FIG. 5.

Instruction fetch circuit 101, as illustrated, may be further configured, based on the determination that fetch group 165 includes control transfer instruction 170, to alter instructions within fetch group 165 in a manner that is based on a type of control transfer instruction 170. Altering may include rearranging an order of instructions of fetch group 165 in an instruction buffer. For example, if control transfer instruction 170 and target address 175 are part of a short-backward branch, then the altering may include placing a portion of instructions in fetch group 165 into two separate locations in an instruction buffer. As another example, if control transfer instruction 170 and target address 175 are part of a short-forward branch, then the altering may include omitting a portion of instructions in fetch group 165 from the instruction buffer. Additional details for the three cases disclosed above are provided below in reference to FIGS. 2-4.

It is noted that system 100, as illustrated in FIG. 1, is merely an example. The illustration of FIG. 1 has been simplified to highlight features relevant to this disclosure. Elements not used to describe the details of the disclosed concepts have been omitted. For example, instruction cache circuit 110 and instruction fetch circuit 101 may be included as part of a processor circuit. In various embodiments, instruction cache circuit 110 and instruction fetch circuit may be implemented, in part or in whole, using any suitable combination of sequential and combinatorial logic circuits. In addition, register and/or memory circuits, such as static random-access memory (SRAM) may be used in these circuits to temporarily hold information such as instructions and/or address values. Processor circuits may include various additional circuits that are not illustrated, such as one or more execution circuits, a load-store circuit, an instruction decode circuit, branch prediction circuits, and the like.

In the description of FIG. 1, altering of instructions in an instruction buffer may differ based on a type of control transfer function is retrieved by the instruction fetch circuit. Three examples of control transfer instruction types that result in altering of instructions in an instruction buffer are presented below, in FIGS. 2-4.

Figure 2:
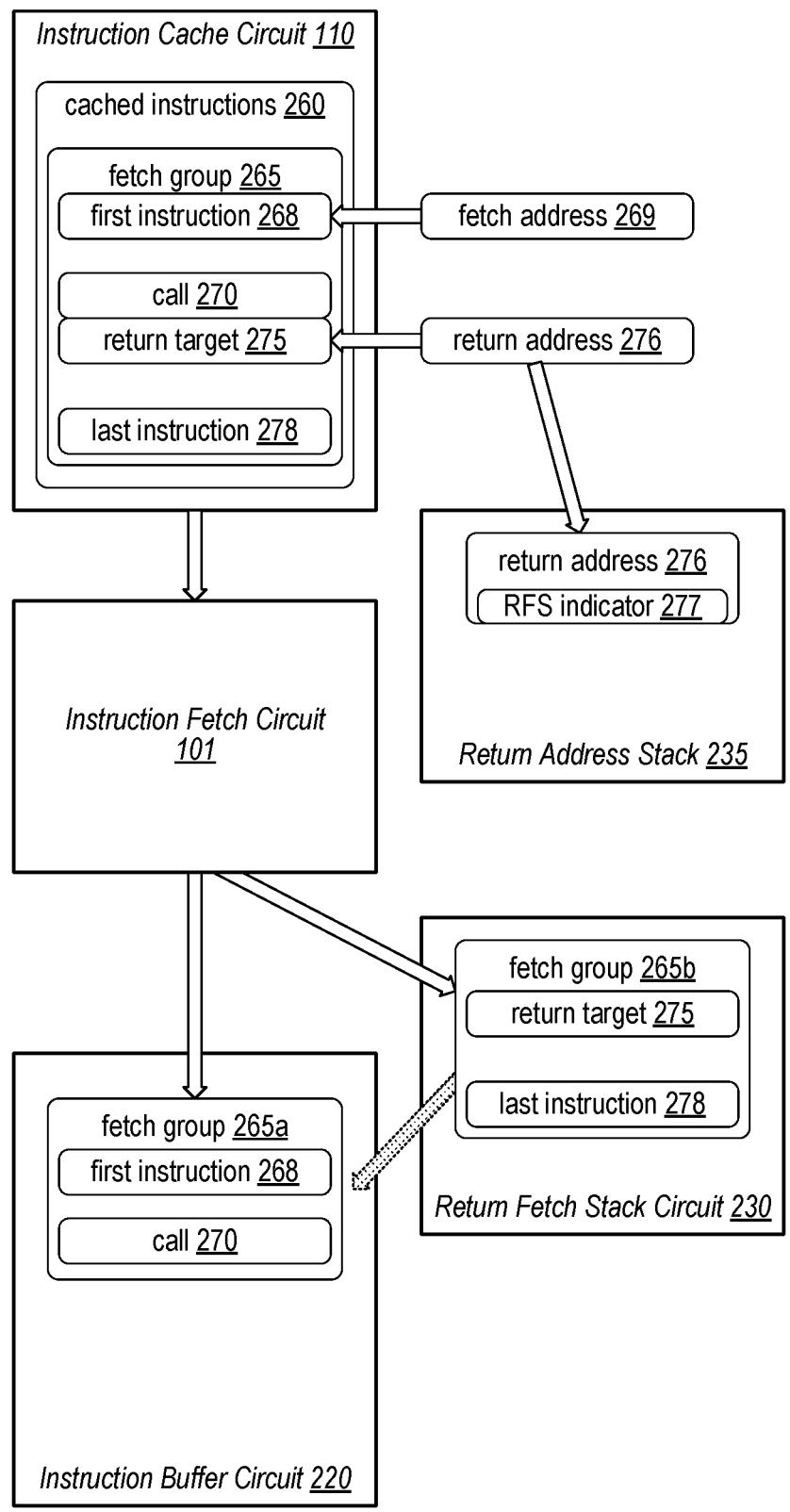
FIG. 2 shows a block diagram of an embodiment of a system with an instruction fetch circuit processing a fetch group with a call instruction.

Moving to FIG. 2, a block diagram of an embodiment of system is shown when a fetch group is associated with a return fetch group. System 200 may correspond to system 100 and includes instruction fetch circuit 101 and instruction cache circuit 110 from FIG. 1. In addition, system 200 includes instruction buffer circuit 220, return fetch stack circuit 230, and return address stack 235. Circuits of system 200 may be coupled via a plurality of bus wires. System 200 depicts how instructions of a fetch group may be altered in response to determining that a type of control transfer instruction in the fetch group is a call instruction.

As illustrated, instruction cache circuit 110 includes, at a given point in time, cached instructions 260. In a manner as described above, instruction fetch circuit 101 is configured to retrieve fetch group 265 from cached instructions 260 in instruction cache circuit 110. Fetch group 265 includes a plurality of instructions beginning with first instruction 268 through to last instruction 278, inclusive. Between first instruction 268 and last instruction 278, fetch group 265 also includes call instruction (call) 270 and return target instruction 275. Call instruction 270 is a particular type of control transfer instruction in which program flow is transferred to a target address referenced by the call instruction, e.g., a program subroutine. A call instruction causes an address of an instructions immediately following the call instruction (referred to as a "return address") to be pushed onto a return address stack. When a return instruction is later fetched (indicating an end to the subroutine), the return address is pulled from the return address stack and instruction fetch circuit 101 retrieves a new fetch group using the return address.

In a typical system, instructions from the return address to the last instruction of the fetch group may be discarded and a new fetch group retrieved based on the target of the call instruction. In cases in which the subroutine to be performed is short, for example, less that a full fetch group, the instruction fetch circuit may retrieve the instructions at the return address just one fetch after discarding these instructions, resulting, for example, in a reduction of bandwidth of system 200 due to retrieving a same set of instructions that had just been fetched, wasting cycles and power on the fetch operation.

In the present example, in response to a determination that the control transfer instruction is call instruction 270, instruction fetch circuit 101 is configured to identify return address 276 of return target instruction 275 that comes after call instruction 270 as an associated target address. Instruction fetch circuit 101 may then push return address 276 onto return address stack 235. In addition, instruction fetch circuit 101 is further configured to store, in instruction buffer circuit 220, a first portion of fetch group 265 (e.g., fetch group 265a) that includes instructions from a beginning of fetch group 265 (first instruction 268) to call instruction 270. Instruction fetch circuit 101 is also configured to store, in return fetch stack circuit 230 (that is different from instruction buffer circuit 220) a second portion of fetch group 265 (fetch group 265b) starting with return target instruction 275 at return address 276.

In some cases, as shown, fetch group 265b includes all instructions from return target instruction 275 to last instruction 278. In other cases, another control transfer instruction may be included after return target instruction 275 and before last instruction 278, which may cause instructions after the second control transfer instruction to be discarded, depending on a type of the second control transfer instruction. It is noted that in embodiments in which a second control transfer function is included in fetch group 265b after return target instruction 275, a branch prediction circuit (not illustrated) may be updated with branch history for both a return instruction that triggered the return to return target instruction 275 and the second control transfer instruction. Both of these branch history updates may be performed within a single update cycle as opposed to generating two branch history updates in series.

Instruction fetch circuit 101, as illustrated, is further configured to retrieve a next fetch group based on the target address of call instruction 270. This next fetch group may then be stored in instruction buffer circuit 220 after fetch group 265a, allowing an execution circuit to perform the instructions of fetch group 265a and then proceed straight to the subroutine at the target of call instruction 270.

In response to fetching a return instruction after call instruction 270, signaling an end to the subroutine, instruction fetch circuit 101 is configured to pull return address 276 from return address stack 235. As shown, the entry in return address stack 235 for return address 276 includes return fetch stack (RFS) indicator 277 that indicates that instructions for a return fetch group corresponding to return address 276 have been stored in return fetch stack circuit 230. In other embodiments, instruction fetch circuit 101 may be configured to use return address 276 (without RFS indicator 277) to determine if an entry in return fetch stack circuit 230 corresponds to return address 276. In response to determining that fetch group 265b is stored in return fetch stack circuit 230, instruction fetch circuit 101 retrieves fetch group 265b from return fetch stack circuit 230 and writes fetch group 265b to instruction buffer circuit 220. In some embodiments, fetch group 265b is appended to the fetch group that includes the return instruction and may be treated as a single unified fetch group. Accordingly, instruction fetch circuit 101 does not retrieve a fetch group corresponding to return address 276 using instruction cache circuit 110. Use of return fetch stack circuit 230 may, therefore, reduce power and time associated with fetching of instructions associated with a return instruction.

In some embodiments, instruction fetch circuit 101 may create an entry for fetch group 265b in return fetch stack circuit 230 in response to a determination that a return instruction is within a particular number of instructions of the target of the call instruction. For example, if the particular number is sixteen, then a determination may be made whether there are fewer than sixteen instructions between the target of the call instruction (e.g., the beginning of a subroutine) and the subsequent return instruction (end of the subroutine). Instruction fetch circuit 101 may utilize a training operation the first time that fetch group 265 is retrieved. In the training operation, return fetch stack circuit 230 may not be used, and instead, the determination of the number of instructions between the target of the call instruction and the return instruction is made. If the number of instructions between the beginning and the end of the subroutine satisfies a threshold number, then an indication may be made (e.g., in a return fetch group tag circuit) and linked to the particular target address of the call instruction. After this training operation, when a given call instruction has the particular target address, then instruction fetch circuit 101 is configured to use return fetch stack circuit 230 as described.

It is noted that the embodiment of FIG. 2 is one example of control transfer instruction types that result in altering of instructions in an instruction buffer. System 200 has been simplified for clarity. As described above for FIG. 1, the illustrated circuit blocks may be included as part of a processor core, such as may be further included in an integrated circuit (e.g., a system-on-chip, or "Sort" for short). Some or all of instruction buffer circuit 220, return fetch stack circuit 230 and/or return address stack may be implemented in a memory circuit as data structures.

Figure 3:
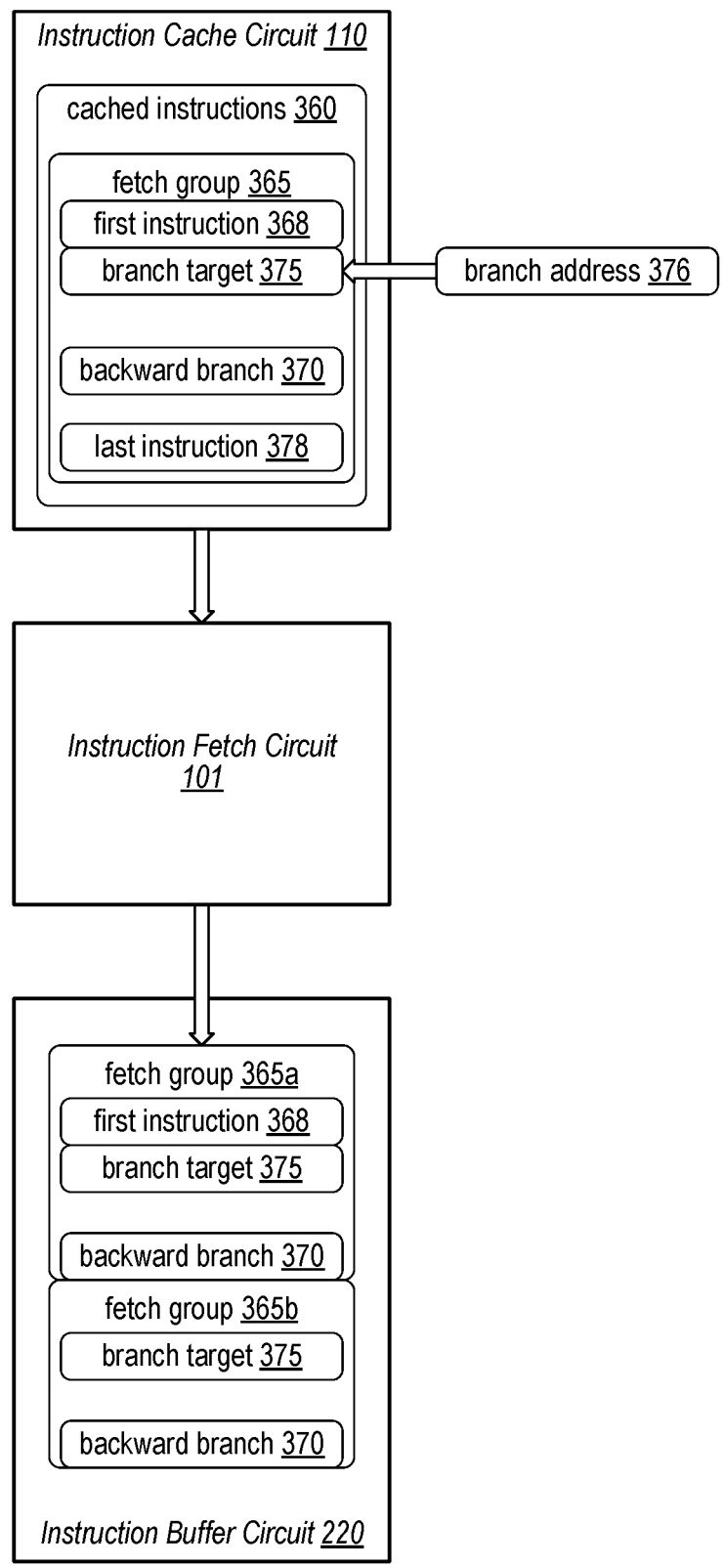
FIG. 3 depicts a block diagram of an embodiment of a system with an instruction fetch circuit processing a fetch group with a backward branch instruction.

Turning to FIG. 3, a block diagram of an embodiment of a system is shown when a fetch group is associated with a backward branch fetch group. System 300 may correspond to system 100 and includes instruction fetch circuit 101 and instruction cache circuit 110 from FIG. 1, and instruction buffer circuit 220 from FIG. 2. System 300 depicts how instructions of a fetch group may be altered in response to determining that a type of control transfer instruction in the fetch group is a backward branch instruction.

At a given point in time, as shown, instruction cache circuit 110 includes cached instructions 360. Instruction fetch circuit 101 is configured to retrieve fetch group 365 from cached instructions 360 in instruction cache circuit 110 as previously described. Fetch group 365 begins with first instruction 368 and ends with last instruction 378. Fetch group 365 also includes backward branch instruction 370 and branch target instruction 375. Backward branch instruction 370 may be a conditional control transfer instruction in which program flow is transferred to branch target instruction 375 at branch address 376 in response to a particular condition being true. If the condition is false, then program flow may continue in a sequential manner. The conditions may correspond to a plurality of conditions tracked in a condition code register, such as whether a most recently accessed value is zero, negative, or resulted in an overflow. In some embodiments, branch conditions may be based on whether a value of an indicated bit at a particular memory address is set or clear. Backwards branch instruction 370 may be used to implement a program loop in which execution of a particular set of instructions is repeated until the condition of backward branch instruction 370 is false, then a fetch group immediately following the last instruction of the loop (i.e., backward branch instruction 370) is retrieved and program flow resumes a sequential order until a subsequent control transfer instruction is fetched.

In a typical system, instructions coming after backwards branch instruction 370 may be discarded (e.g., last instruction 378) and a new fetch group is retrieved using branch address 376. In cases in which the loop to be performed is short, for example, all instructions of the loop fit within instruction buffer circuit 220, repeatedly retrieving the instructions may be wasteful of both processing time and power. In some embodiments, such a short loop may be written to instruction buffer circuit 220 once, and traditional branch prediction circuits used to predict a final iteration of the loop. On the final iteration, a fetch group to a subsequent address may be fetched.

Branch prediction circuits, however, may have entries of a limited size for collecting branch history used for making the predictions. In such cases, the final iteration may not be predicted, resulting in a misprediction and, therefore, time and power wasted to flush instruction buffer circuit 220 and fetch the correct instructions. Additionally, after backward branch instruction 370 has been identified as part of a short backwards loop, then updates to the branch prediction circuit may be omitted, in particular if a loop count of the short backward branch exceeds the size of a branch history entry.

To alter instructions in the example of FIG. 3, instruction fetch circuit 101 is configured, in response to a determination that the control transfer instruction is backwards branch instruction 370 and that a number of instructions within a branch loop satisfies a threshold limit, to store a first portion of fetch group 365 (e.g., fetch group 365a) followed by a second portion of fetch group 365 (e.g., fetch group 365b) in instruction buffer circuit 220. The first and second portions of fetch group 365 each include at least an instruction at the associated target address (branch target instruction 375) and backward branch instruction 370. As shown, the branch loop (instructions from branch target instruction 375 to backward branch instruction 370, inclusive) is repeated within instruction buffer circuit 220, as fetch groups 365a and 365b. By including two copies of the branch loop (e.g., unrolling the loop once), accesses to instruction cache circuit 110, branch prediction circuits, next fetch predictor circuits and the like may be reduced up to 50%.

As illustrated, to determine that the control transfer instruction is a backward branch instruction, instruction fetch circuit 101 is configured to determine that backward branch instruction 370 is taken more than a threshold number of consecutive times. For example, in some embodiments, a short loop that may otherwise be small enough to unroll once in instruction buffer circuit 220, may not be unrolled if a number of iterations of the loop does not satisfy the threshold number during a training operation (e.g., during a first occurrence of the loop during program execution). In such cases, the single iteration of the loop is written to instruction buffer circuit 220 and the branch prediction circuit is used during each iteration of the loop to predict an exit from the loop. Using the branch prediction circuit for each iteration when loop iterations are low, may decrease chances of a misprediction at the end of the loop. When loop iterations are high, however, power and bandwidth saved by performing two iterations of the loop without accessing branch prediction and next fetch circuits may more than offset lost bandwidth and power due to a misprediction. In cases where the loop count exceeds the history capacity of the branch prediction circuits, the chance of a misprediction increases even without unrolling the loop. Accordingly, saving bandwidth and power when a chance for a misprediction is high may provide overall system gains in bandwidth and reductions in power consumption.

It is noted that system 300 is another example of control transfer instruction types that result in altering of instructions in an instruction buffer. Circuits of system 300 have been omitted for clarity. For example, although branch prediction and next fetch predictor circuits are disclosed, these circuits have been left out of FIG. 3 but may be included in other embodiments. As described above for FIG. 1, the illustrated circuit blocks may be included as part of a processor core, such as may be further included in an integrated circuit.

Figure 4:
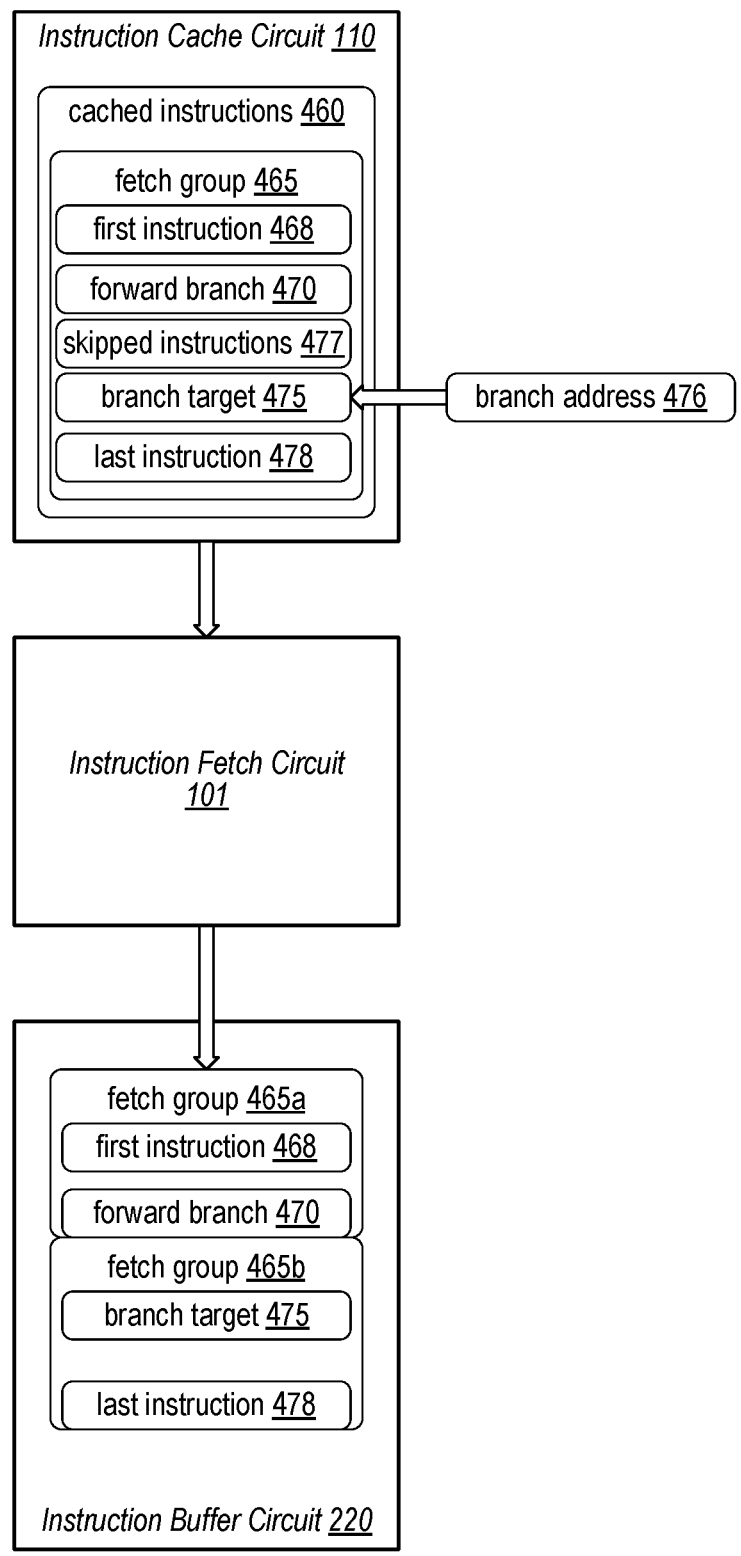
FIG. 4 illustrates a block diagram of an embodiment of a system with an instruction fetch circuit processing a fetch group with a forward branch instruction.

Proceeding to FIG. 4, a block diagram of an embodiment of a system in which a fetch group is associated with a forward branch fetch group. System 400 may correspond to system 100 and, like systems 200 and 300, includes instruction fetch circuit 101, instruction cache circuit 110, and instruction buffer circuit 220 from FIGS. 1 and 2. System 400 depicts how instructions of a fetch group may be altered in response to determining that a type of control transfer instruction in the fetch group is a forward branch instruction.

As illustrated, instruction cache circuit 110 includes, at a given point in time, cached instructions 460. In a similar manner as previously described, instruction fetch circuit 101 is configured to retrieve fetch group 465 from cached instructions 460 in instruction cache circuit 110. Fetch group 465 begins with first instruction 468 and ends with last instruction 478. Fetch group 465 also includes forward branch instruction 470 and branch target instruction 475. Forward branch instruction 470 may be a control transfer instruction in which program flow is transferred to branch target instruction 475 at branch address 476, thereby skipping over one or more skipped instructions 477. In some embodiments, forward branch instruction 470 may be a conditional branch instruction that branches over skipped instructions 477 only when an indicated condition is satisfied.

In a typical system, instructions coming after forward branch instruction 470 may be discarded (e.g., from skipped instructions 477 through last instruction 478) and a new fetch group is retrieved using branch address 476. In some cases, such the present example, branch address 476 is included in fetch group 465. Discarding skipped instructions through last instruction 478 and then retrieving the instructions in a second fetch operation may be wasteful of both processing time and power.

To alter instructions in the example of FIG. 4, instruction fetch circuit 101 is configured, in response to a determination that the control transfer instruction is forward branch instruction 470, to store a first portion of fetch group 465 (e.g., fetch group 465a) in instruction buffer circuit 220. As shown, fetch group 465a includes instructions from a beginning of fetch group 465 (first instruction 468) to forward branch instruction 470. Instruction fetch circuit 101 may be further configured to identify a second portion of fetch group 465 (e.g., fetch group 465b) starting with an instruction at the associated target address (branch address 476). Depending on instructions included in fetch group 465, fetch group 465b may include branch target instruction 475 through last instruction 478, inclusive. If, however, a control transfer instruction is included between branch target instruction 475 and last instruction 478, then last instruction 478 and other instructions may be omitted from fetch group 465b.

In various embodiments, information regarding forward branch instruction 470 may or may not be sent to a branch prediction circuit. In some embodiments, after identifying forward branch instruction 470 as a short forward branch, branch history information may not be collected, which in turn, may simplify circuitry of instruction fetch circuit 101 and/or increase an efficiency for fetching and executing instructions. Once forward branch instruction 470 has been identified, then the branch prediction circuits may not be used upon subsequent fetches of forward branch instruction 470, and instead, instruction fetch circuit 101 processes the identified forward branch instruction 470 as described herein.

As illustrated, instruction fetch circuit 101 is also configured to store fetch group 465b consecutive to fetch group 465a in instruction buffer circuit 220, omitting skipped instructions 477 between forward branch instruction 470 and branch target instruction 475. By retaining instructions in fetch group 465b, rather than discarding and subsequently re-fetching, instruction fetch circuit 101 may increase bandwidth and reduce power consumption of system 400. In addition, handling forward branch instruction 470 within fetch group 465 eliminates a second fetch operation to retrieve instructions of fetch group 465b, thereby allowing a branch prediction circuit included in system 400 to predict a second branch instruction that may be included in fetch group 465b, after forward branch instruction 470. Accordingly, two branch instructions may be handled within a single fetch group.

It is noted that the system of FIG. 4 provides another example of control transfer instruction types that result in altering of instructions in an instruction buffer. Similar to systems 100-300, some circuits of system 400 have been excluded to increase clarity. In other embodiments, for example, additional circuits such as branch prediction circuits may be included. As previously disclosed, illustrated circuit blocks may be included as part of a processor core, such as may be included in an integrated circuit.

Figure 5:
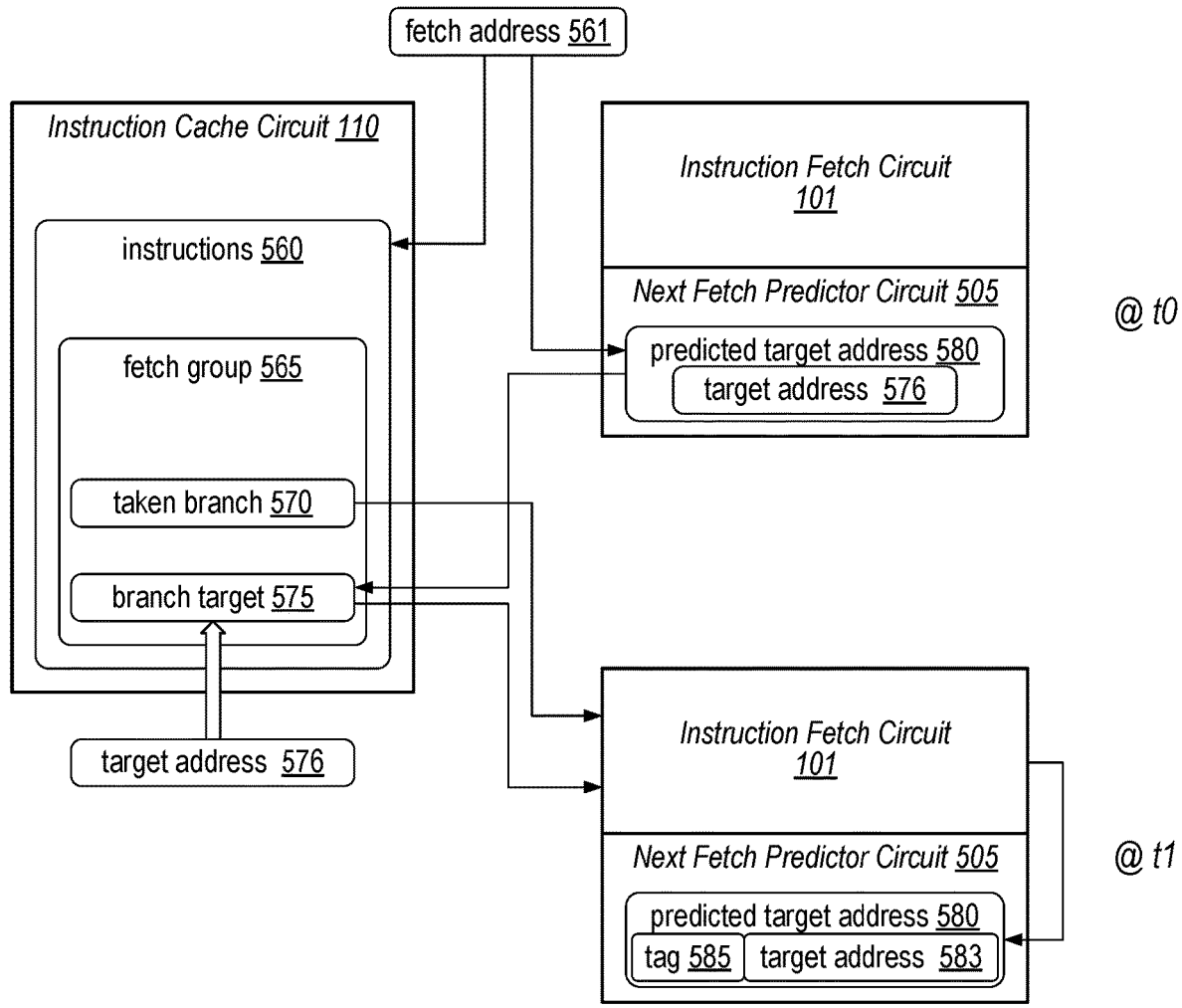
FIG. 5 shows a block diagram of an embodiment of a system with an instruction fetch circuit and a next fetch predictor circuit at two points in time.

In FIGS. 1-4, various embodiments of systems are shown that alter instruction order based on determinations of particular types of control transfer instructions. Various techniques may be used to make the determination that a particular type of control transfer instruction is included in a given fetch group. FIG. 5 depicts an example making such a determination.

Moving now to FIG. 5, a block diagram of an embodiment of system that tags references to a fetch address if a determination is made that the fetch group includes a particular type of control transfer instruction is illustrated. System 500 may correspond to any of the previously described systems 100-400. System 500 includes instruction fetch circuit 101 and instruction cache circuit 110 from system 100 in FIG. 1. System 500 also includes next fetch predictor circuit 505.

As illustrated, system 500 includes instruction cache circuit 110, configured to store a plurality of instructions 560. Instructions 560 includes instructions retrieved from fetch address 561 and included in fetch group 565. Instructions in fetch group 565 include taken branch instruction 570 that directs program flow to branch target instruction 575 at target address 576. In various embodiments, target address 576 may come before or after an address of taken branch instruction 570, resulting in either a forward or backward branch. In other embodiments, taken branch instruction 570 may be a call instruction and branch target instruction 575 may be an instruction immediately following the call instruction, e.g., a target of a subsequent return instruction.

Next fetch predictor circuit 505 is configured to predict, using a particular fetch address, a target address of a control transfer instruction in a fetch group. As shown, fetch group 565 includes taken branch instruction 575 that directs program flow to target address 576. At time t0, next fetch predictor circuit 505 includes an entry corresponding to fetch address 561, the entry including next predicted target address 580 that corresponds to target address 576.

As illustrated, instruction fetch circuit 101 is configured to retrieve, using fetch address 561, fetch group 565 from the plurality of instructions 560 in instruction cache circuit 110. Instruction fetch circuit 101 is further configured to determine, using predicted target address 580 from next fetch predictor circuit 505, that the control transfer instruction (e.g., taken branch instruction 570) is predicted to be taken and that a destination of an associated target address 576 is included in fetch group 565. For example, after instruction fetch circuit 101 retrieves fetch group 565, next fetch predictor circuit 505 uses fetch address 561 to predict a next fetch address. An entry corresponding to fetch address 561 includes predicted target address 580, which at time t0, includes target address 576, the target of taken branch instruction 570. Accordingly, next fetch predictor circuit is configured to send target address 576 to instruction fetch circuit 101 for use as a next fetch address. Instruction fetch circuit 101, however, may determine that target address 576 is included in the current fetch group 565.

In response to the determination, instruction fetch circuit 101 may be further configured to tag a reference to the fetch address 561 in next fetch predictor circuit 505. For example, instruction fetch circuit may, after the initial retrieval of fetch group 565, tag the entry corresponding to fetch address 561 in response to a determination that both taken branch instruction 570 and branch target instruction 575 are included in fetch group 565. As shown at time t1, tag 585 is added to the entry for predicted target address 580.

In some embodiments, the determination both taken branch instruction 570 and branch target instruction 575 are included in fetch group 565 may be made after instruction fetch circuit 101 retrieves a next fetch group based on target address 576. For example, before tag 585 is added to the entry for predicted target address 580, instruction fetch circuit 101 may be configured to proceed with a next fetch operation using target address 576 as the fetch address. After the determination that target address 576 is in fetch group 565, instruction fetch circuit 101 may be configured to determine if a second control transfer instruction is included within fetch group 565. If a second control transfer instruction is identified, then instruction fetch circuit 101 may update the entry for predicted target address 580 to include target address 583 corresponding to the second control transfer instruction.

At a later point in time, instruction fetch circuit 101 may be further configured to retrieve, using fetch address 561 subsequent to the tagging, fetch group 565 from instruction cache circuit 110, including taken branch instruction 570. In response to tag 585, instruction fetch circuit 101 may bypass next fetch predictor circuit 505 for determining the target address of taken branch instruction 570. For example, after a subsequent retrieval of fetch group 565, instruction fetch circuit 101 may determine, using tag 585, that fetch group 565 includes taken branch instruction 570 and branch target instruction 575 at the associated target address 576. Since instructions at target address 576 have already been retrieved, instruction fetch circuit 101 may skip a retrieval of the next fetch group based on target address 576.

In response to the inclusion of tag 585 in the entry for predicted target address 580, instruction fetch circuit 101 may be configured to store a first portion of fetch group 565 in an instruction buffer circuit (e.g., instruction buffer circuit 220 in FIGS. 2-4) in an order in which the first portion was fetched. Instruction fetch circuit 101 may also be configured to store a second portion of fetch group 565 in the instruction buffer circuit in an order that differs from the order in which the second portion was fetched relative to the first portion. The first portion may include a first instruction in fetch group 565 up to and including taken branch instruction 570. The second portion may be based on target address 576 and a type of instruction that is taken branch instruction 570. For example, as disclosed in regard to FIGS. 2-4, the second portion may include instructions at a target of a call instruction as shown in FIG. 2, or a repeat off instructions included in a program loop as shown in FIG. 3. As shown in FIG. 4, the second portion may include instructions at a target of a forward branch instruction and exclude instructions between a taken forward branch instruction and the target of the taken forward branch instruction.

It is noted that system 500 of FIG. 5 is merely an example for demonstrating disclosed concepts. Additional circuits may be included in other embodiments. For example, an instruction buffer circuit (such as instruction buffer circuit 220 shown in FIGS. 2-4) is discussed but not illustrated in FIG. 5. As previously described, any of the illustrated circuits may be included in an integrated circuit, and implemented, in whole or in part, using any suitable combination of sequential and combinatorial logic circuits.

To summarize, various embodiments of a system that includes an instruction fetch circuit configured to alter an order of fetched instructions based on determining that a particular type of control transfer function is included are disclosed. Broadly speaking, apparatus, systems, and methods are contemplated in which an embodiment of an apparatus, for example, includes an instruction cache circuit and an instruction fetch circuit. The instruction fetch circuit may be configured to retrieve, from the instruction cache circuit, a fetch group that includes a plurality of instructions for execution by a processing circuit, and to make a determination that the fetch group includes a control transfer instruction that is predicted to be taken. A target address associated with the control transfer instruction may be directed to an instruction within the fetch group. The instruction fetch circuit may be further configured to, based on the determination, alter instructions within the fetch group in a manner that is based on a type of the control transfer instruction.

In a further example, to alter the instructions within the fetch group, the instruction fetch circuit may be configured, in response to a determination that the control transfer instruction is a call instruction, to identify an address of an instruction after the call instruction as the associated target address. The instruction fetch circuit may be further configured to store, in an instruction buffer circuit, a first portion of the fetch group that includes instructions from a beginning of the fetch group to the call instruction, and to store, in a return fetch stack circuit that is different from the instruction buffer circuit, a second portion of the fetch group starting with the instruction at the associated target address. The instruction fetch circuit may also be configured to retrieve a next fetch group based on a target address of the call instruction.

In an example, to alter the instructions within the fetch group, the instruction fetch circuit may be configured, in response to a determination that the control transfer instruction is a backward branch instruction, to store a first portion of the fetch group followed by a second portion of the fetch group in an instruction buffer. The first and second portions of the fetch group may each include at least an instruction at the associated target address and the backward branch instruction. In an additional example, to determine that the control transfer instruction is a backward branch instruction, the instruction fetch circuit may be configured to determine that the backward branch instruction is taken more than a threshold number of consecutive times.

In another example, to alter the instructions within the fetch group, the instruction fetch circuit may be configured, in response to a determination that the control transfer instruction is a forward branch instruction, to store a first portion of the fetch group in an instruction buffer circuit. The first portion of the fetch group may include instructions from a beginning of the fetch group to the forward branch instruction. The instruction fetch circuit may also be configured to identify a second portion of the fetch group starting with an instruction at the associated target address, and to store the second portion of the fetch group consecutive to the first portion in the instruction buffer circuit, omitting instructions between the forward branch instruction and the instruction at the associated target address.

In a further example, to make the determination, the instruction fetch circuit may be configured, after an initial retrieval of the fetch group, to tag a reference to a fetch address corresponding to the fetch group in response to a determination that the control transfer instruction and the instruction at the associated target address are included in the fetch group. The instruction fetch circuit may be further configured, after a subsequent retrieval of the fetch group, to determine, using the tagged reference, that the fetch group includes the control transfer instruction and the instruction at the associated target address.

In one example, the instruction fetch circuit may be further configured, after the initial retrieval of the fetch group, to retrieve a next fetch group based on the associated target address. The instruction fetch circuit may be further configured, after the subsequent retrieval of the fetch group, to skip a retrieval of the next fetch group based on the associated target address.

Another example of a disclosed system includes an instruction cache circuit, a next fetch predictor circuit, and an instruction fetch circuit. The instruction cache circuit may be configured to store a plurality of instructions. The next fetch predictor circuit may be configured to predict, using a particular fetch address, a target address of a control transfer instruction in a fetch group. The instruction fetch circuit may be configured to retrieve, using the particular fetch address, the fetch group from the plurality of instructions in the instruction cache circuit, and to determine, using the predicted target address from the next fetch predictor circuit, that the control transfer instruction is predicted to be taken and that a destination of an associated target address is included in the fetch group. The instruction fetch circuit may also be configured to in response to the determination, tag a reference to the particular fetch address in the next fetch predictor circuit.

In a further example, the instruction fetch circuit may be further configured to retrieve, using the particular fetch address subsequent to the tagging, the fetch group from the instruction cache circuit, including the predicted taken control transfer instruction and, in response to the tagged reference, to bypass the next fetch predictor circuit for determining the target address of the predicted taken control transfer instruction. In an example, the instruction fetch circuit may be further configured to store a first portion of the fetch group in an instruction buffer circuit in an order in which the first portion was fetched, and to store a second portion of the fetch group in the instruction buffer circuit in an order that differs from the order in which the second portion was fetched relative to the first portion. The second portion may be based on the target address and a type of the predicted taken control transfer instruction.

In another example, in response to a determination that the control transfer instruction is a call instruction, the instruction fetch circuit may be further configured to identify an address subsequent to the address of the call instruction as the associated target address. In one example, in response to a determination that the control transfer instruction is a backward branch instruction, the instruction fetch circuit may be further configured to determine that the associated target address, corresponding to the target address of the backward branch, is between the particular fetch address and an address of the backward branch instruction, inclusive.

In a further example, to tag the reference to the particular fetch address, the instruction fetch circuit may be further configured to determine that the backward branch instruction is taken more than a threshold number of consecutive times. In another example, in response to a determination that the control transfer instruction is a forward branch instruction, the instruction fetch circuit may be further configured to determine that the associated target address, corresponding to the target address of the forward branch, is between an address of the forward branch instruction and a last address of the fetch group. The next fetch predictor circuit may be further configured to determine if a second transfer control instruction is included in the fetch group after the forward branch instruction.

The circuits and techniques described above in regards to FIGS. 1-5 may be performed using a variety of methods. Four methods associated with handing particular types of control transfer instructions are described below in regard to FIGS. 6-9.

Turning now to FIG. 6, a flow diagram for an embodiment of a method for altering an order of fetched instructions based on a determined type of control transfer function is illustrated. Method 600 may be used in conjunction with any of the computer circuitry, systems, devices, elements, or components disclosed herein, such as systems 100-500 illustrated in FIGS. 1-5. Method 600 is described below using system 100 of FIG. 1 as an example. References to elements in FIG. 1 are included as non-limiting examples.

As illustrated, method 600 begins at 610 by retrieving, by an instruction fetch circuit, a fetch group that includes a plurality of instructions for execution by a processing circuit. For example, instruction fetch circuit 101 retrieves instructions of fetch group 165 from instruction cache circuit 110. Fetch group 165, as shown, includes control transfer instruction 170 that has target address 175.

Method 600 continues at 620 by determining, by the instruction fetch circuit, that the fetch group includes a control transfer instruction that is predicted to be taken and that the control transfer instruction has an associated target address directed to an instruction included within the fetch group. For example, instruction fetch circuit 101 determines that fetch group 165 includes control transfer instruction 170 with target address 175. Instruction fetch circuit 101 may further determine that target address 175 is an address that falls within the instructions included within fetch group 165. In some embodiments, this determination may be made by identifying a tag included with a fetch address used to retrieve fetch group 165, such as tag 585 as shown in FIG. 5. Such a tag may be added to the corresponding fetch address in response to a learning operation performed after an initial fetch of fetch group 165.

The method continues at 630 by, based on the determining, altering an order of instructions within the fetch group in a manner that is based on a type of the control transfer instruction. The order may be altered by rearranging an execution order of the instructions as the instructions are written to an instruction buffer circuit (e.g., instruction buffer circuit 220 in FIGS. 2-4). In some cases, the reordering may include writing a first portion of the instructions into the instruction buffer that includes instructions from a first instruction in fetch group 165 up to and including the taken control transfer instruction 170. This first portion may be followed by a second portion that is determined based on the type of instruction that is control transfer instruction 170. Three example types of control transfer instructions are described below in regard to FIGS. 7-9.

It is noted that the method of FIG. 6 includes elements 610-630. Method 600 may end in block 630 or may repeat some or all blocks of the method. For example, method 600 may return to block 610 to retrieve a subsequent fetch group with a particular type of control transfer function. In some cases, method 600 may be performed concurrently with other instantiations of the method. For example, an integrated circuit may include a plurality of instances of system 100. Multiple instances may perform method 600 in an overlapping manner.

Figure 7:
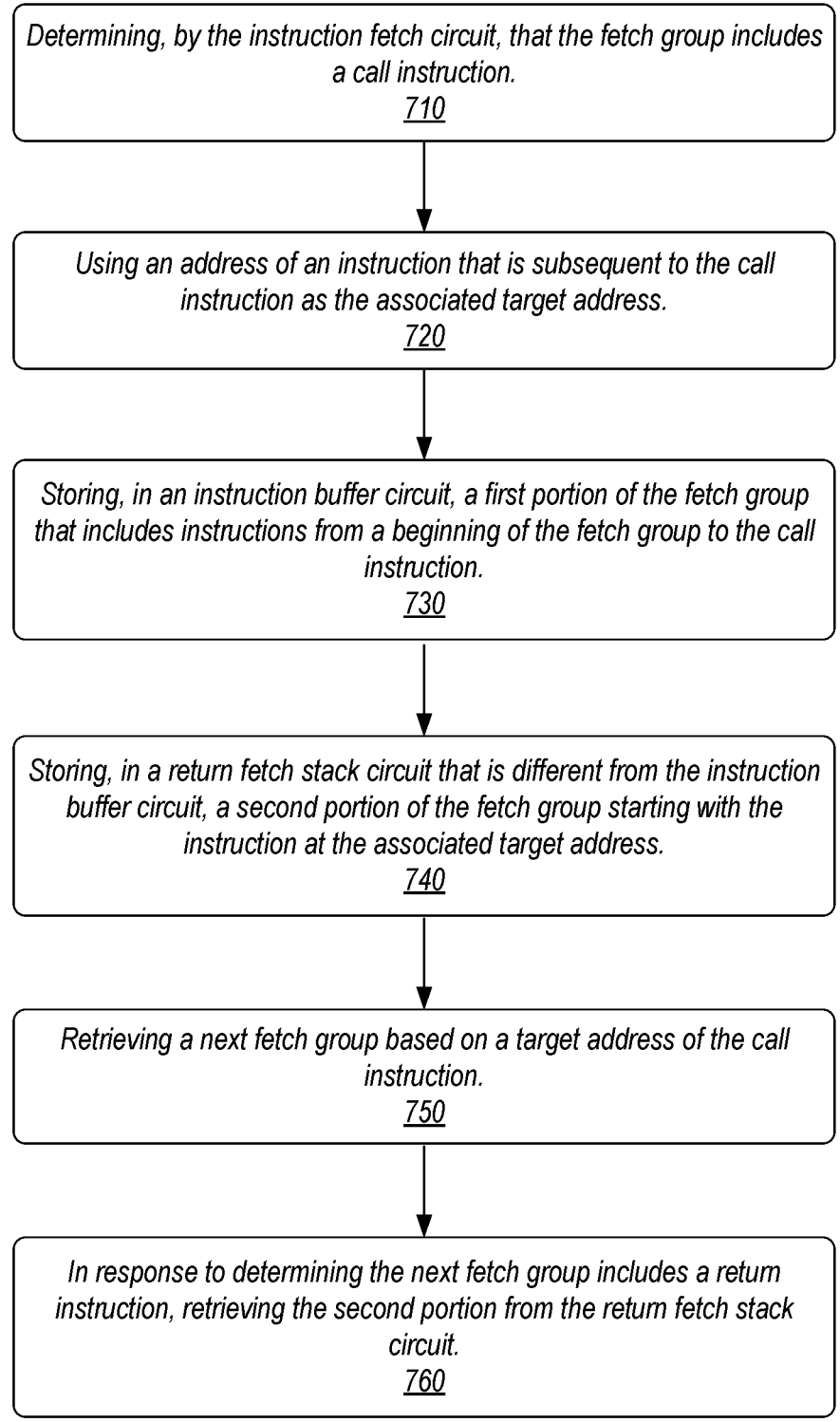
FIG. 7 illustrates a flow diagram of an embodiment of a method for retrieving a fetch group that includes a call instruction.

Proceeding now to FIG. 7, a flow diagram for an embodiment of a method for altering an order of fetched instructions based on determining that a fetch group includes a call instruction is illustrated. Similar to method 600, method 700 may be used in conjunction with any of the computer circuitry, systems, devices, elements, or components disclosed herein, such as systems 100-500. In some embodiments, method 700 may correspond to, or be included in, operations of blocks 620 and 630 of method 600. Method 700 is described below using system 200 of FIG. 2 as an example. References to elements in FIG. 2 are included as non-limiting examples.

As illustrated, method 700 begins at 710 by determining, by an instruction fetch circuit, that a control transfer instruction is a call instruction. As illustrated, method 700 begins after block 610 of method 600 has been performed, resulting in instruction fetch circuit 101 having retrieved fetch group 265. Instruction fetch circuit 101 identifies an included control transfer instruction as being call instruction 270. In some embodiments, the identification of call instruction 270 in fetch group 265 may be performed during a training operation occurring at a first time that fetch group 265 is retrieved. In such embodiments, a tag may be added to a fetch address reference for fetch group 265, such as shown in FIG. 5.

At 720, method 700 continues by using an address of an instruction that is subsequent to the call instruction as the associated target address. Instruction fetch circuit 101 may identify an address of an instruction immediately following call instruction 270, as shown, return target instruction 275. Return target instruction 275 is located at return address 276, so return address 276 is used as the target address. Return address 276 is pushed onto return address stack 235 to be used later when a return instruction corresponding to call instruction 270 is fetched. In some embodiments, return fetch stack (RFS) indicator 277 is pushed onto return address stack 235 along with return address 276. RFS indicator 277 may signal instruction fetch circuit 101 that instructions for the associated return address are located in an entry in return fetch stack circuit 230, and therefore, do not need to be fetched from instruction cache circuit 110.

The method continues at 730 by storing, in an instruction buffer circuit, a first portion of the fetch group that includes instructions from a beginning of the fetch group to the call instruction. The first portion of fetch group 265 (fetch group 265*a*) includes instructions from first instruction 268 through call instruction 270, inclusive. Instructions of fetch group 265*a* are written to instruction buffer circuit 220 in an order in which they will be executed (e.g., an execution order) by one or more execution circuits.

At 740, the method continues by storing, in a return fetch stack circuit that is different from the instruction buffer circuit, a second portion of the fetch group starting with the instruction at the associated target address. The second portion of fetch group 265 (fetch group 265*b*) includes instructions from return target instruction 275 through last instruction 278, inclusive. Rather than being discarded, instructions of fetch group 265*b* are written to an entry in return stack circuit 230, in execution order.

Method 700 proceeds to 750 by retrieving a next fetch group based on a target address of the call instruction. To perform call instruction 270, instructions beginning at a call target address included in call instruction 270 are fetched as a next fetch group. Instruction fetch circuit 101 may retrieve instructions from instruction cache circuit 110 using the call target address. Fetched instructions may then be written to instruction buffer circuit 220 in execution order following fetch group 265*a*.

At 760, method 700 may proceed by, in response to determining the next fetch group includes a return instruction, retrieving the second portion from the return fetch stack circuit. A return instruction corresponding to call instruction 270 may be included in the next fetch group that was retrieved using the call target address. In some embodiments, instruction fetch circuit 101 may only use return fetch stack circuit 230 if the return instruction corresponding to call instruction 270 is included in the next fetch group. In cases where the corresponding return instruction is in a fetch group subsequent to the next fetch group (e.g., a subroutine associated with call instruction 270 is long or includes a further control transfer instruction resulting in a subsequent fetch operation), then fetch group 265*b* may not be written to return fetch stack circuit 230 and RFS indicator 277 may not be included with return address 276 in return address stack 235.

If, however, RFS indicator 277 (or a different indication is present for an entry in return fetch stack circuit 230 associated with fetch group 235*b*), then fetch group 235*b* is pulled from return fetch stack circuit 230 and placed in instruction buffer circuit 220 in execution order. Accordingly, instructions of fetch group 265*b* are placed in instruction buffer circuit 220 without have to re-fetch the instructions from instruction cache circuit 110 after fetching the corresponding return instruction.

It is noted that method 700 includes elements 710-760. Method 700 may end in block 760 or may repeat some or all blocks of the method. For example, method 700 may return to block 710 in response to a subsequent fetch of a different call instruction. In some cases, method 700 may be performed concurrently with other instantiations of the method. In some embodiments, for example, the different call instruction may be fetched in block 750. In such a case, a second instantiation of method 700 (or a portion thereof) may be performed, for example, between operations of blocks 750 and 760 of the first instantiation.

Figure 8:
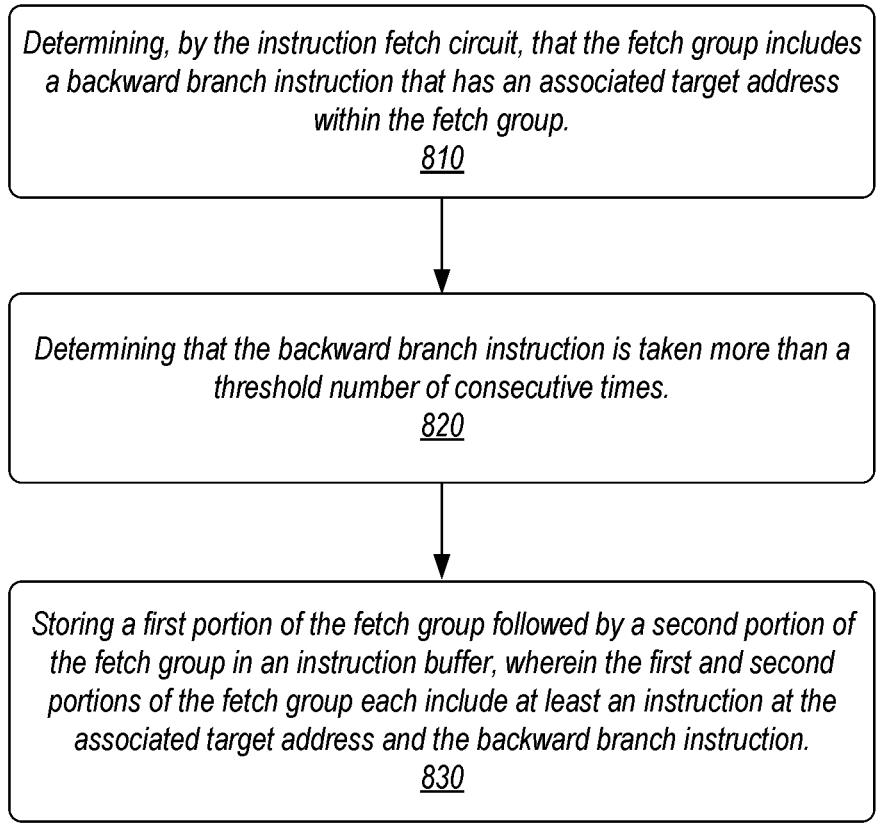
FIG. 8 shows a flow diagram of an embodiment of a method for retrieving a fetch group that includes a backward branch instruction.

Moving to FIG. 8, a flow diagram for an embodiment of a method for altering an order of fetched instructions based on determining that a fetch group includes a backward branch instruction is illustrated. In a similar manner as methods 600 and 700, method 800 may be used in conjunction with any of the computer circuitry, systems, devices, elements, or components disclosed herein, such as systems 100-500. Method 800 is described below using system 300 of FIG. 3 as an example. References to elements in FIG. 3 are included as non-limiting examples.

As illustrated, method 800 begins at 810 by determining, by an instruction fetch circuit, that a fetch group includes a backward branch instruction that has an associated target address within the fetch group. In a similar manner as method 700, method 800 begins after block 610 of method 600 has been performed, resulting in instruction fetch circuit 101 having retrieved fetch group 365. Instruction fetch circuit 101 identifies an included control transfer instruction as being backward branch instruction 370. As shown, backward branch instruction 370 includes branch address 376 that directs program flow back to branch target instruction 375. In a like manner as described for block 710 above, the identification of backward branch instruction 370 in fetch group 365 may, in some embodiments, be performed during a training operation occurring at a first time that fetch group 365 is retrieved.

Method 800 may, optionally, continue by determining that the backward branch instruction is taken more than a threshold number of consecutive times. In some embodiments, operations of block 820 may be optional. In embodiments that include performing operations of block 820, the backward branch instruction may only be recognized as one of the particular types of control transfer instructions if the loop created by the backward branch instruction is repeated a threshold number of consecutive times. As described above in regard to FIG. 3, taking backward branch instruction 370 causes a set of instructions from branch target instruction 375 up to backward branch instruction 370 to be repeated at least once. In some embodiments, backward branch instruction 370 may be a conditional branch instruction that continues to be taken until a specified condition is not valid, causing the loop to be exited. In other embodiments, backward branch instruction 370 may be an unconditional branch instruction and a different instruction within the loop may be a conditional branch instruction that, when taken, causes the loop to be exited, and otherwise allows program flow to remain in the loop. In some cases, the condition for exiting the loop may be a value of a counter reaching a threshold value. When the threshold is met, the loop is exited. If block 820 is included, then an observed number of loop iterations must satisfy a threshold number in order for the method to continue at 830. Otherwise, if the threshold is not satisfied, method 800 may end.

At 830, method 800 proceeds by storing a first portion of the fetch group followed by a second portion of the fetch group in an instruction buffer, wherein the first and second portions of the fetch group each include at least an instruction at the associated target address and the backward branch instruction. To alter instructions of fetch group 365, the first portion of fetch group 365 (e.g., fetch group 365a) includes instructions from first instruction 368 to backward branch instruction 370. It is noted that fetch group 365a includes the full loop plus one or more instructions (e.g., first instruction 368 which is not in the loop in this example) that are not included in the loop. The second portion of fetch group 365 (e.g., fetch group 365b), includes the instructions comprising the loop (e.g., from branch target instruction 375 to backward branch instruction 370).

By duplicating the instructions of the loop within instruction buffer circuit 220, accesses to other circuits for determining a next fetch address, such as branch prediction circuits and/or next fetch predictor circuits, may be reduced as such accesses may only be made at the end of fetch group 365b as program flow continues from fetch group 365a into fetch group 365b as long as the condition for remaining in the loop remains true. Although a misprediction may occur when the loop is exited, bandwidth and power savings accrued from the reduction of accessing the other circuits may offset the extra bandwidth and power consumed by the misprediction, resulting in a net savings.

It is noted that the method of FIG. 8 includes elements 810-830. Method 800 may end in block 830 or may repeat some or all blocks of the method. For example, method 800 may return to block 810 in response to retrieving a backward branch instruction in a subsequent fetch group. In some cases, method 800 may be performed concurrently with other instantiations of itself or the other disclosed methods. For example, system 300 may include a multi-core processor and/or a multi-threaded processor core, in which case, two processor cores, or two threads in a single multi-threaded core may concurrently retrieve fetch groups that include backward branch instructions. Two instances of method 800 may, therefore be performed by the two cores (or the multi-threaded core) in an overlapping manner.

Figure 9:
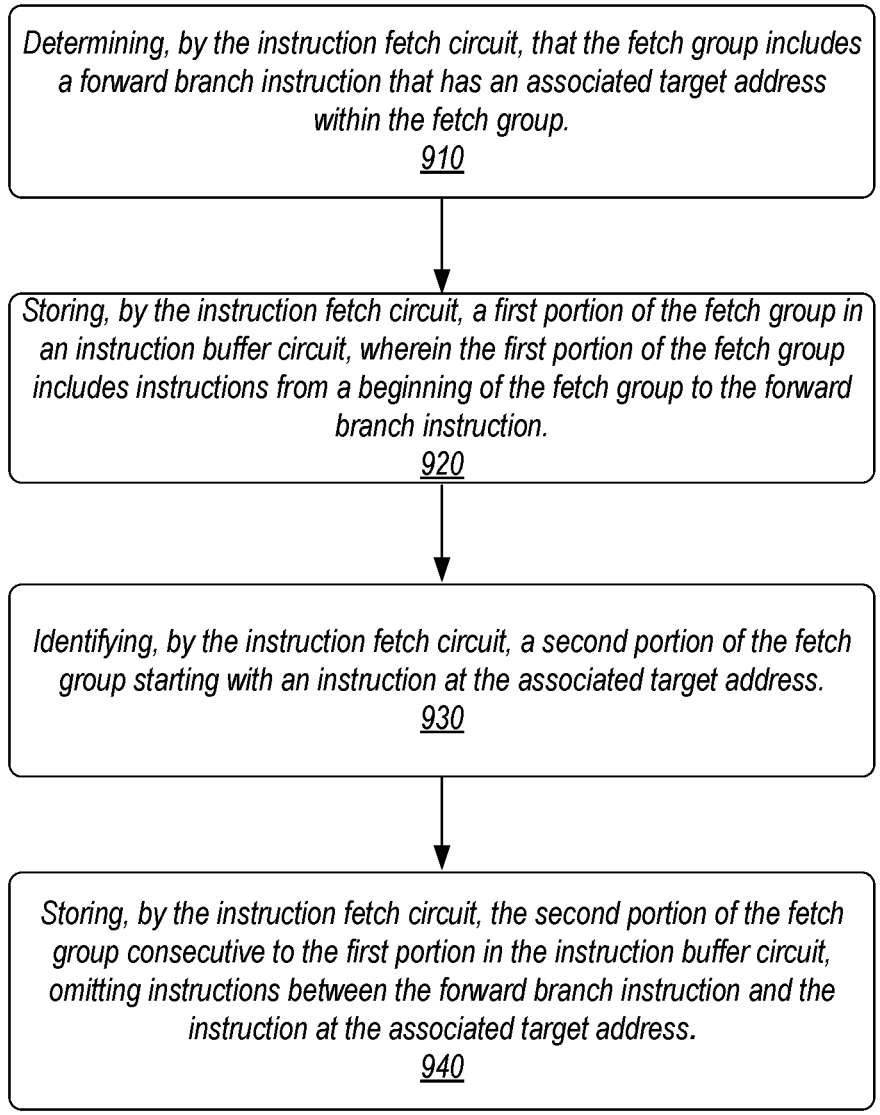
FIG. 9 depicts a flow diagram of an embodiment of a method for retrieving a fetch group that includes a forward branch instruction.

Turning to FIG. 9, a flow diagram for an embodiment of a method for altering an order of fetched instructions based on determining that a fetch group includes a forward branch instruction is illustrated. Similar to methods 600-800, method 900 may be performed by any of the computer circuitry, systems, devices, elements, or components disclosed herein, such as systems 100-500. Method 900 is described below using system 400 of FIG. 4 as an example. References to elements in FIG. 4 are included as non-limiting examples.

Method 900 begins, as shown, at 910 by determining that a fetch group includes a forward branch instruction that has an associated target address within the fetch group. As described for methods 700 and 800, method 900 begins after block 610 of method 600 has been performed, resulting in instruction fetch circuit 101 having retrieved fetch group 465. Instruction fetch circuit 101 identifies an included control transfer instruction as being forward branch instruction 470. As shown, forward branch instruction 470 includes branch address 476 that directs program flow past one or more skipped instructions 477 to branch target instruction 475. In a like manner as described for blocks 710 and 810 above, the identification of forward branch instruction 470 in fetch group 465 may, in some embodiments, be performed during a training operation occurring at a first time that fetch group 465 is retrieved.

Method 900 continues at 920 by storing, by the instruction fetch circuit, a first portion of the fetch group in an instruction buffer circuit, wherein the first portion of the fetch group includes instructions from a beginning of the fetch group to the forward branch instruction. To alter instructions of fetch group 465, the first portion of fetch group 465 (e.g., fetch group 465a) includes instructions from first instruction 468 to forward branch instruction 470. Fetch group 465a is written to instruction buffer circuit 220, in execution order.

At 930, method 900 continues by identifying, by the instruction fetch circuit, a second portion of the fetch group starting with an instruction at the associated target address. Instruction fetch circuit 101 determines that a target address for forward branch instruction 470 is branch address 476 which is where branch target instruction 475 is located. Starting with branch target instruction 475, instruction fetch circuit 101 identifies instructions to include in the second portion of fetch group 465 (e.g., fetch group 465b) up to and including last instruction 478. In other embodiments, however, fetch group 465b may end before last instruction 478 if a second, taken control transfer instruction is located at or after branch address 476 and before the address of last instruction 478.

The method further continues at 940 by storing, by the instruction fetch circuit, the second portion of the fetch group consecutive to the first portion in the instruction buffer circuit, omitting instructions between the forward branch instruction and the instruction at the associated target address. As illustrated, the fetch group is stored in instruction buffer circuit 220 by omitting skipped instructions 477 between forward branch instruction 470 and branch target instruction 475 at branch address 476. By omitted skipped instructions 477, instruction fetch circuit 110 may be capable of performing a next fetch operation and writing instructions retrieved from the next fetch operation into instruction buffer circuit 220 in remaining locations that may have otherwise been occupied by skipped instructions 477.

It is noted that method 900 includes elements 910-940. Method 900 may end in block 940 or may repeat some or all blocks of the method. For example, method 900 may return to block 910 in response to retrieving another forward branch instruction in a subsequent fetch group. In a manner as described above, any of the disclosed methods may be performed concurrently with other instantiations of itself or the other disclosed methods.

Figure 10:
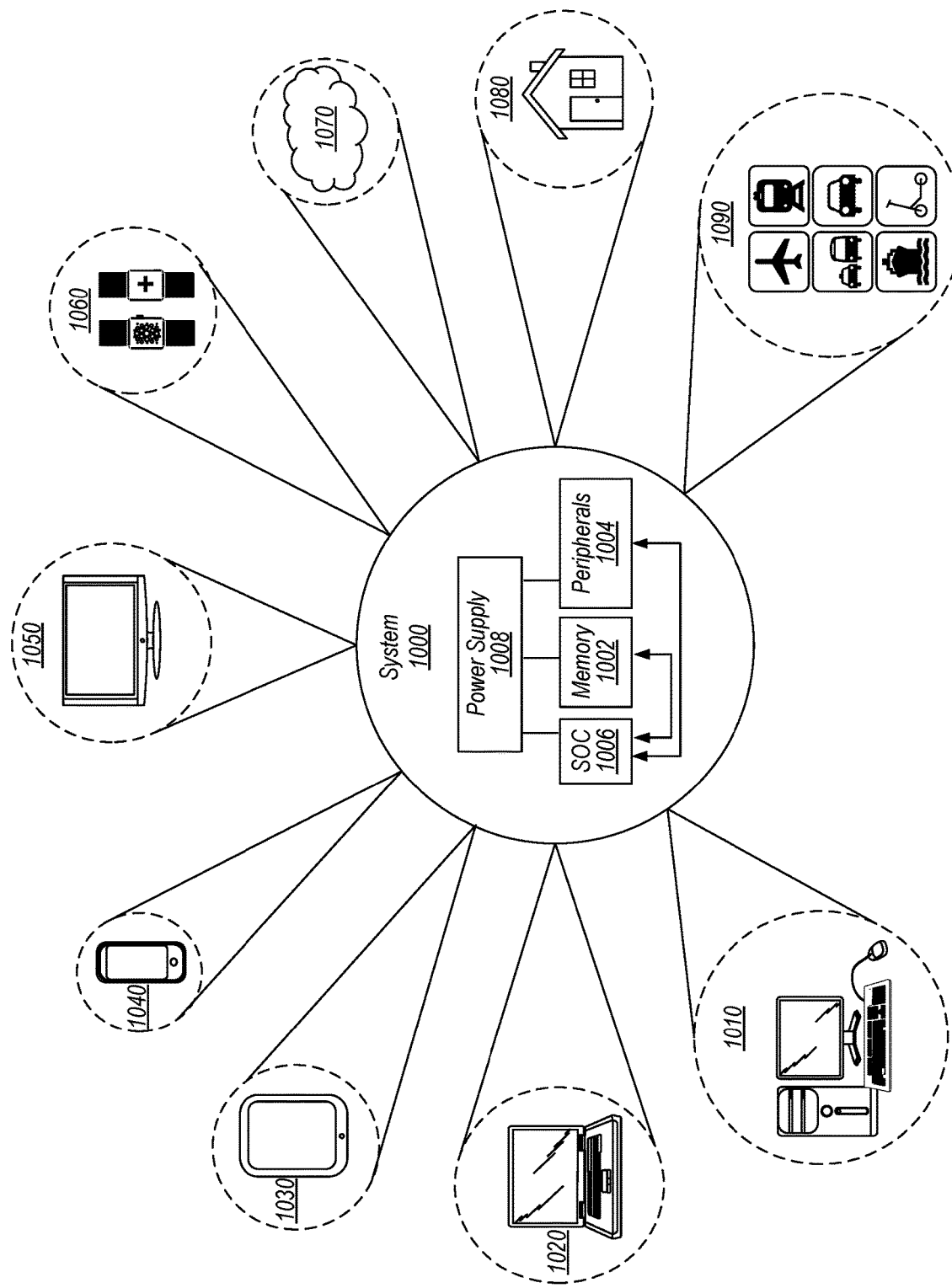
FIG. 10 illustrates various embodiments of systems that include coupled integrated circuits.

FIGS. 1-9 illustrate circuits and methods for a system, such as an integrated circuit, that includes an instruction fetch circuit configured to alter an order of fetched instructions based on determining that a particular type of control transfer function is included in the fetched instructions. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 1000 is illustrated in FIG. 10. Computer system 1000 may, in some embodiments, include one or more of any of the disclosed systems 100-500.

In the illustrated embodiment, the system 1000 includes at least one instance of a system on chip (SoC) 1006 which may include multiple types of processor circuits, such as a central processing unit (CPU), a graphics processing unit (GPU), or otherwise, a communication fabric, and interfaces to memories and input/output devices. The circuits included in SoC 1006 may be implemented using any suitable combination of sequential and combinatorial logic circuits. In addition, register and/or memory circuits, such as static random-access memory (SRAM), data latches, flip-flops, and the like, may be used in these circuits to temporarily hold information such as instructions, addresses, and other such information. Some memories, such as cache circuits, may include content-addressable memory (CAM) circuits. One or more of these processor circuits may correspond to an instance of the systems disclosed herein. In various embodiments, SoC 1006 is coupled to external memory circuit 1002, peripherals 1004, and power supply 1008.

A power supply 1008 is also provided which supplies the supply voltages to SoC 1006 as well as one or more supply voltages to external memory circuit 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory circuit 1002 is included as well).

External memory circuit 1002 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1002 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1060 are contemplated as well, such as devices worn around the neck, devices attached to hats or other headgear, devices that are implantable in the human body, eyeglasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise.

It is noted that the wide variety of potential applications for system 1000 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 10 are illustrative only and are not intended to be limiting. Other devices are possible and are contemplated.

As disclosed in regards to FIG. 10, computer system 1000 may include one or more integrated circuits included within a personal computer, smart phone, tablet computer, or other type of computing device. A process for designing and producing an integrated circuit using design information is presented below in FIG. 11.

Figure 11:
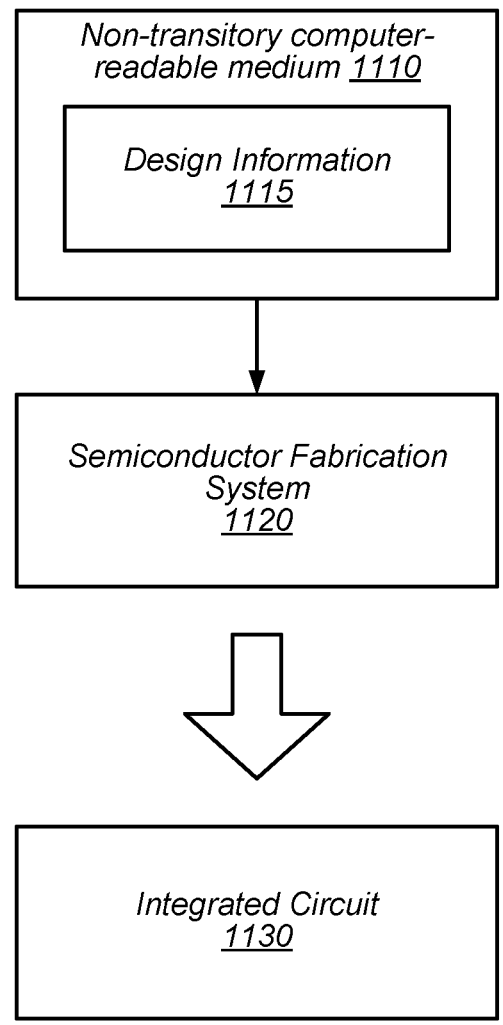
FIG. 11 is a block diagram of an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture integrated circuits, for example, systems including one or more instances of systems 100-500 shown in FIGS. 1-5. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   an instruction cache circuit;
   a next fetch predictor circuit that includes an entry corresponding to a fetch address, wherein the entry includes a first target address of a first control transfer instruction in a fetch group associated with the fetch address; and
   an instruction fetch circuit configured to:
      retrieve, from the instruction cache circuit based on the fetch address, the fetch group that includes a plurality of instructions for execution by a processing circuit;
      determine, based on the entry, that the fetch group includes the first control transfer instruction that is predicted to be taken and an instruction at the first target address; and
      based on the determination:
         add a tag to the entry, wherein the tag is indicative that the first target address and the first control transfer instruction are included in the fetch group;
         determine that a second control transfer instruction is included in the fetch group, the second control transfer instruction having a second target address; and
         update the entry to include the second target address in place of the first target address.

2. The apparatus of claim 1, wherein the instruction fetch circuit is further configured to:
   in response to a determination that the first control transfer instruction is a call instruction:
      identify an address of an instruction after the call instruction as the first target address;
      store, in an instruction buffer circuit, a first portion of the fetch group that includes instructions from a beginning of the fetch group to the call instruction;
      store, in a return fetch stack circuit that is different from the instruction buffer circuit, a second portion of the fetch group starting with the instruction at the first target address; and
      retrieve a next fetch group based on a target address of the call instruction.

3. The apparatus of claim 1, wherein the instruction fetch circuit is further configured to:
   in response to a determination that the first control transfer instruction is a backward branch instruction, store a first portion of the fetch group followed by a second portion of the fetch group in an instruction buffer; and
   wherein the first and second portions of the fetch group each include at least the instruction at the first target address and the backward branch instruction.

4. The apparatus of claim 3, wherein to determine that the first control transfer instruction is the backward branch instruction, the instruction fetch circuit is configured to determine that the backward branch instruction is taken more than a threshold number of consecutive times.

5. The apparatus of claim 1, wherein the instruction fetch circuit is further configured to:
   in response to a determination that the first control transfer instruction is a forward branch instruction:
      store a first portion of the fetch group in an instruction buffer circuit, wherein the first portion of the fetch group includes instructions from a beginning of the fetch group to the forward branch instruction;
      identify a second portion of the fetch group starting with the instruction at the first target address; and
      store the second portion of the fetch group consecutive to the first portion in the instruction buffer circuit, omitting instructions between the forward branch instruction and the instruction at the first target address.

6. The apparatus of claim 1, wherein the instruction fetch circuit is further configured to:
   after a subsequent retrieval of the fetch group, determine, using the tag, that the fetch group includes the first control transfer instruction and the instruction at the first target address.

7. The apparatus of claim 6, wherein the instruction fetch circuit is further configured to:
   after an initial retrieval of the fetch group, retrieve a next fetch group based on the first target address; and
   after the subsequent retrieval of the fetch group, skip a retrieval of the next fetch group based on the first target address.

8. A method, comprising:
   storing, by a next fetch predictor circuit, a first target address of a first control transfer instruction into an entry corresponding to a fetch address;
   retrieving, by an instruction fetch circuit using the fetch address, a fetch group that includes a plurality of instructions for execution by a processing circuit;
   determining, by the instruction fetch circuit, that the fetch group includes the first control transfer instruction that is predicted to be taken and that the first target address is directed to an instruction included within the fetch group;
   based on the determining that the fetch group includes the first control transfer instruction and the first target address:
      adding a tag to the entry corresponding to the fetch address in the next fetch predictor circuit;
      identifying a second target address of a second control transfer instruction in the fetch group; and
      replacing the first target address with the second target address in the entry.

9. The method of claim 8, wherein, in response to determining that the first control transfer instruction is a call instruction: using an address of an instruction that is subsequent to the call instruction as the first target address;
   storing, in an instruction buffer circuit, a first portion of the fetch group that includes instructions from a beginning of the fetch group to the call instruction; and
   storing, in a return fetch stack circuit that is different from the instruction buffer circuit, a second portion of the fetch group starting with the instruction at the first target address.

10. The method of claim 9, further comprising:
    retrieving a next fetch group based on a target address of the call instruction; and
    in response to determining the next fetch group includes a return instruction, retrieving the second portion from the return fetch stack circuit.

11. The method of claim 8, wherein, in response to determining that the first control transfer instruction is a backward branch instruction:
    storing a first portion of the fetch group followed by a second portion of the fetch group in an instruction buffer, wherein the first and second portions of the fetch group each include at least the instruction at the first target address and the backward branch instruction.

12. The method of claim 11, further comprising determining that the first control transfer instruction is the backward branch instruction in response to determining that the backward branch instruction is taken more than a threshold number of consecutive times.

13. The method of claim 8, wherein, in response to determining that the first control transfer instruction is a forward branch instruction: storing the fetch group in an instruction buffer circuit by omitting instructions between the forward branch instruction and the instruction at the first target address.

14. A system comprising:
an instruction cache circuit configured to store a plurality of instructions;
a next fetch predictor circuit configured to store, in an entry corresponding to a particular fetch address, a first target address of a first control transfer instruction in a fetch group; and
an instruction fetch circuit configured to:
retrieve, using the particular fetch address, the fetch group from the plurality of instructions in the instruction cache circuit;
determine, using the entry from the next fetch predictor circuit, that the first control transfer instruction is predicted to be taken and that the first target address is included in the fetch group;
in response to the determination:
tag the entry in the next fetch predictor circuit;
identify a second target address of a second control transfer instruction in the fetch group; and
replace the first target address with the second target address in the entry.

15. The system of claim 14, wherein the instruction fetch circuit is further configured to:
retrieve, using the particular fetch address subsequent to the tagging, the fetch group from the instruction cache circuit, including the predicted taken first control transfer instruction; and
in response to the tagged entry, bypass the next fetch predictor circuit for determining the first target address of the predicted taken first control transfer instruction.

16. The system of claim 15, wherein the instruction fetch circuit is further configured to:
store a first portion of the fetch group in an instruction buffer circuit in an order in which the first portion was fetched; and
store a second portion of the fetch group in the instruction buffer circuit in an order that differs from an order in which the second portion was fetched relative to the first portion, wherein the second portion is based on the first target address and a type of the predicted taken first control transfer instruction.

17. The system of claim 15, wherein, in response to a determination that the first control transfer instruction is a call instruction, the instruction fetch circuit is further configured to:
identify an address subsequent to an address of the call instruction as the first target address.

18. The system of claim 15, wherein, in response to a determination that the predicted taken first control transfer instruction is a backward branch instruction, the instruction fetch circuit is further configured to:
determine that the first target address is between the particular fetch address and an address of the backward branch instruction, inclusive.

19. The system of claim 18, wherein to tag the entry, the instruction fetch circuit is further configured to determine that the backward branch instruction is taken more than a threshold number of consecutive times.

20. The system of claim 15, wherein, in response to a determination that the first control transfer instruction is a forward branch instruction, the instruction fetch circuit is further configured to:
determine that the first target address, corresponding to a target address of the forward branch instruction, is between an address of the forward branch instruction and a last address of the fetch group.

* * * * *